(No Model.) 11 Sheets—Sheet 1.

S. A. WOODS.
WOOD PLANING MACHINE.

No. 398,362. Patented Feb. 19, 1889.

WITNESSES:
David Haselhie
N. P. Ockington.

INVENTOR,
Solomon A. Woods (No Model.) 11 Sheets—Sheet 2.

S. A. WOODS.
WOOD PLANING MACHINE.

No. 398,362. Patented Feb. 19, 1889.

WITNESSES:
INVENTOR
Solomon A. Woods (No Model.) 11 Sheets—Sheet 3.
S. A. WOODS.
WOOD PLANING MACHINE.
No. 398,362. Patented Feb. 19, 1889.
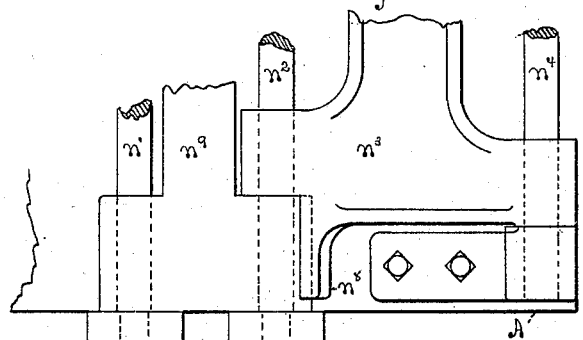
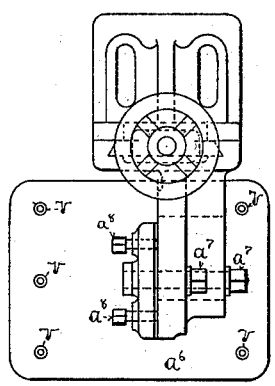
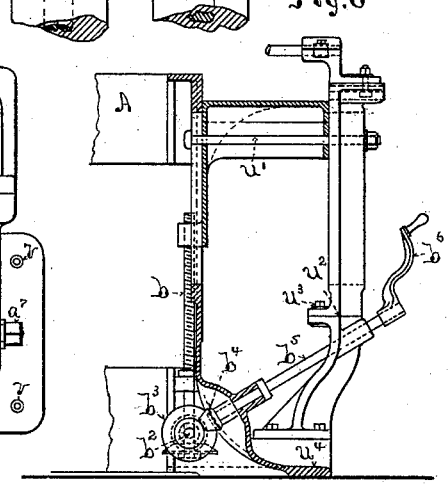
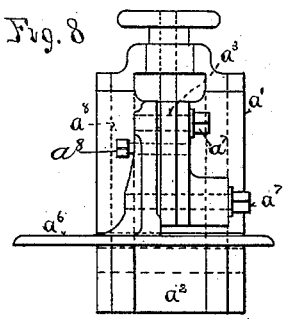
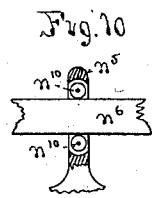
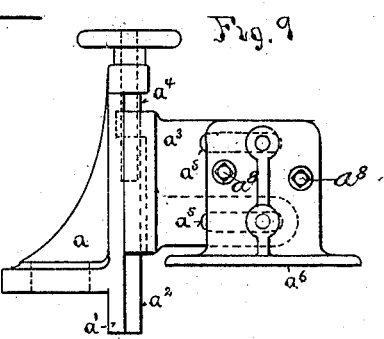
WITNESSES:
David Hall Rice
N. P. Ockington
INVENTOR
Solomon A. Woods (No Model.) 11 Sheets—Sheet 4.
S. A. WOODS.
WOOD PLANING MACHINE.
No. 398,362. Patented Feb. 19, 1889.
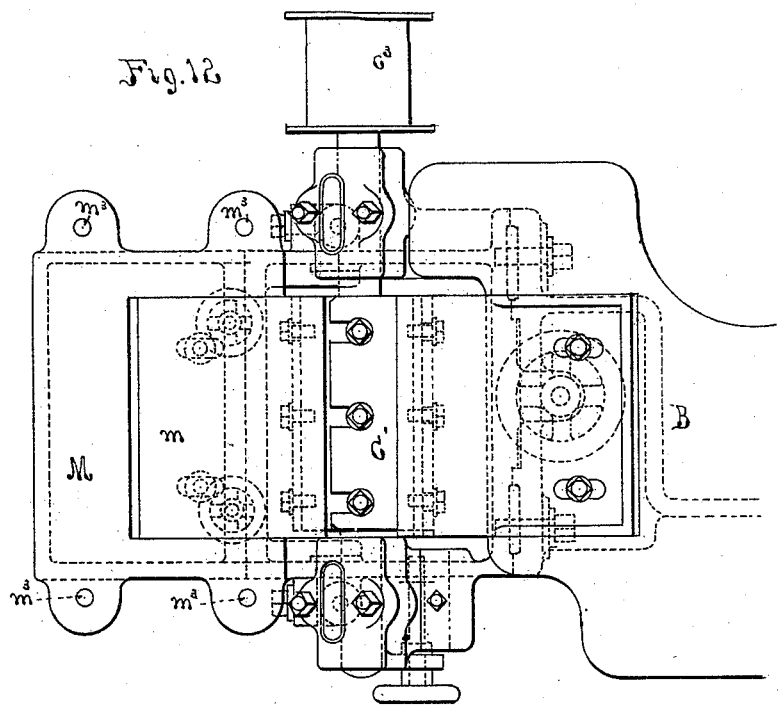
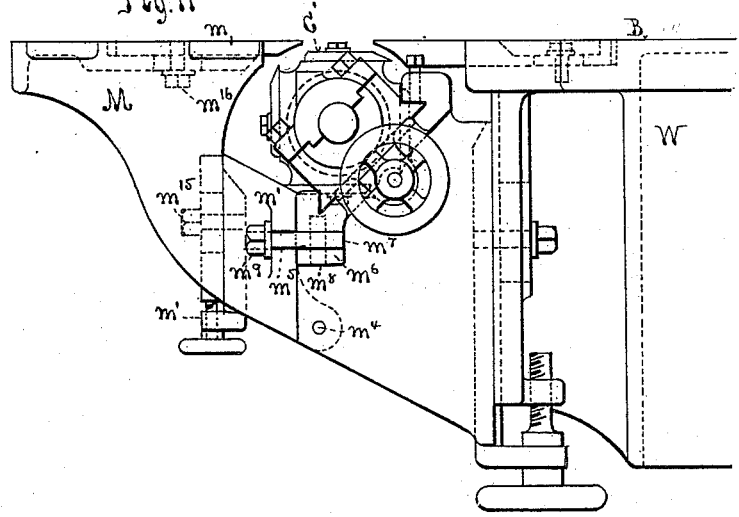
WITNESSES:
N. P. Ockington
Daniel T. Simpson
INVENTOR
Solomon A. Woods
By David Hall Rice
Atty.

(No Model.) 11 Sheets—Sheet 5.
S. A. WOODS.
WOOD PLANING MACHINE.

No. 398,362. Patented Feb. 19, 1889.

WITNESSES:
N. P. Ockington
Daniel T. Simpson

INVENTOR
Solomon A. Woods
BY David Hall

ATTORNEY (No Model.) 11 Sheets—Sheet 6.
S. A. WOODS.
WOOD PLANING MACHINE.
No. 398,362. Patented Feb. 19, 1889.
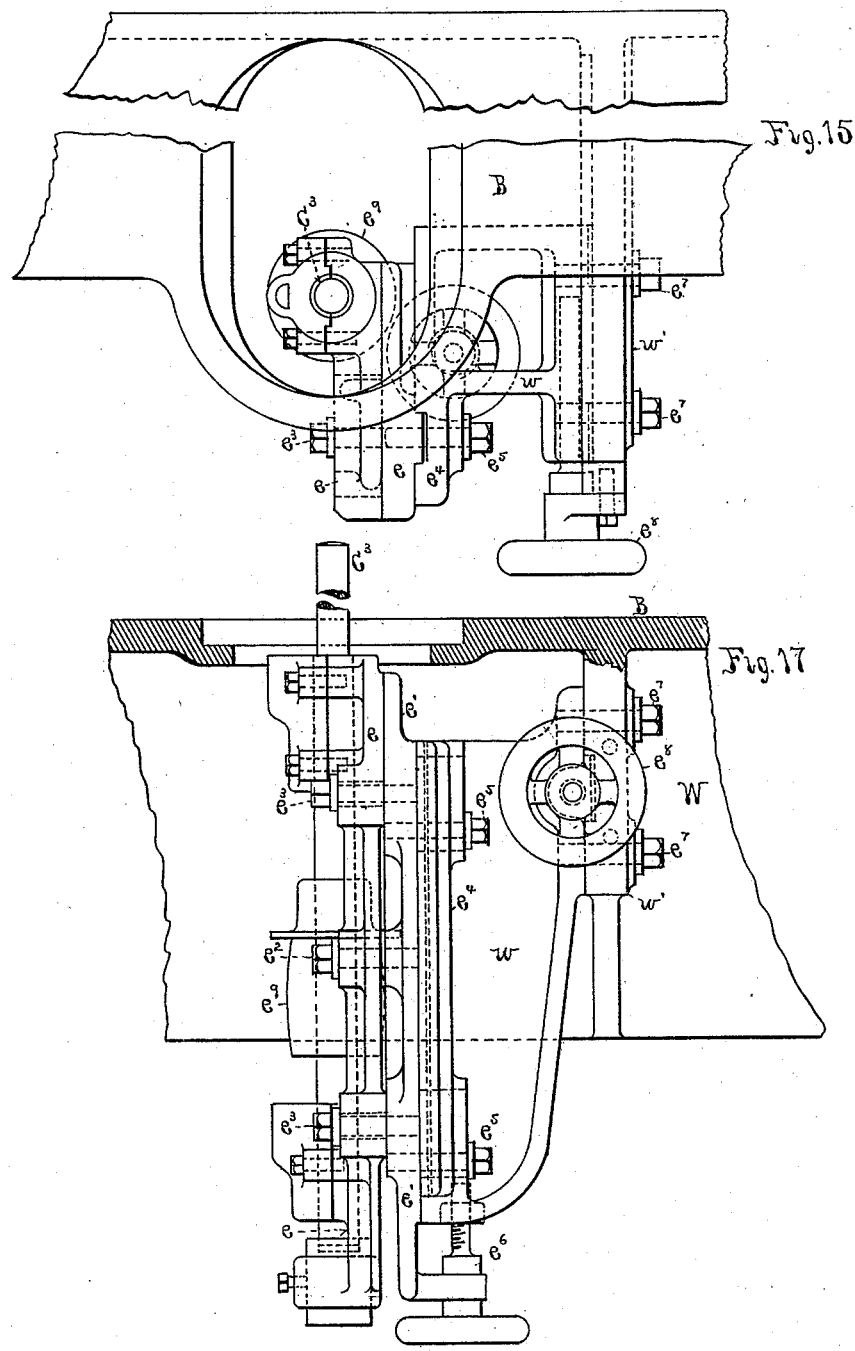

(No Model.)  11 Sheets—Sheet 7.
S. A. WOODS.
WOOD PLANING MACHINE.
No. 398,362.  Patented Feb. 19, 1889.
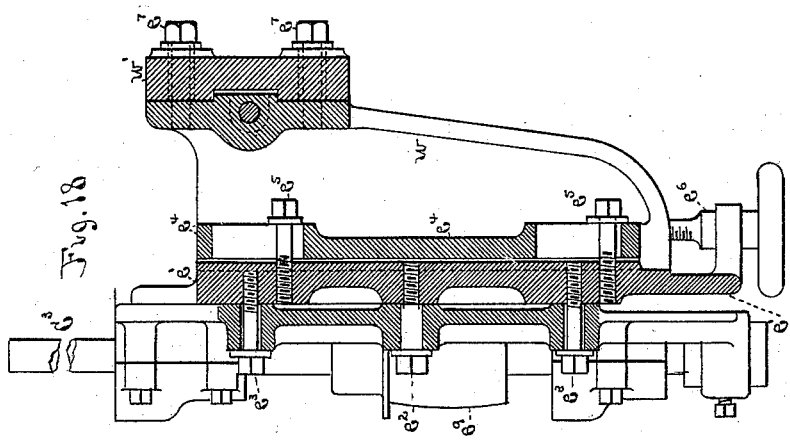
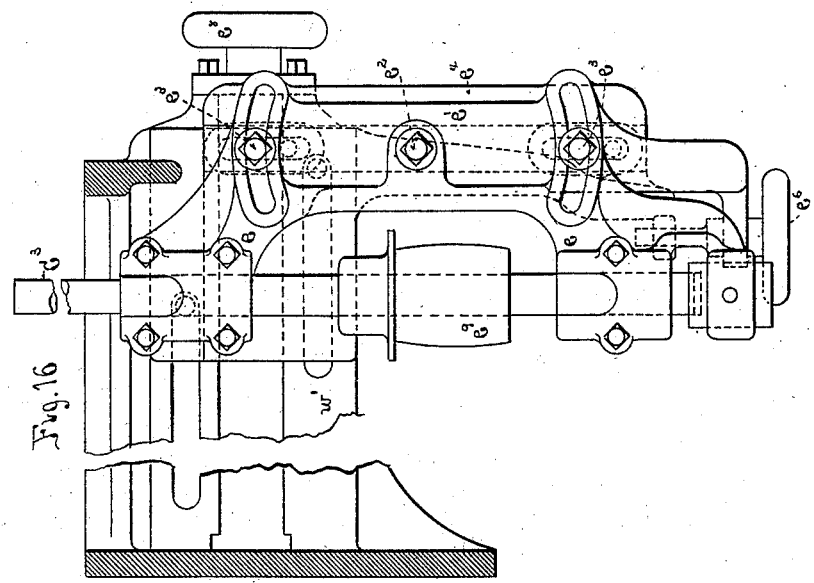
WITNESSES:  
N. P. Ockington.  
Daniel T. Simpson.
INVENTOR  
Solomon A. Woods.  
BY David Hall Rice
ATTORNEY (No Model.) 11 Sheets—Sheet 8.
S. A. WOODS.
WOOD PLANING MACHINE.
No. 398,362. Patented Feb. 19, 1889.
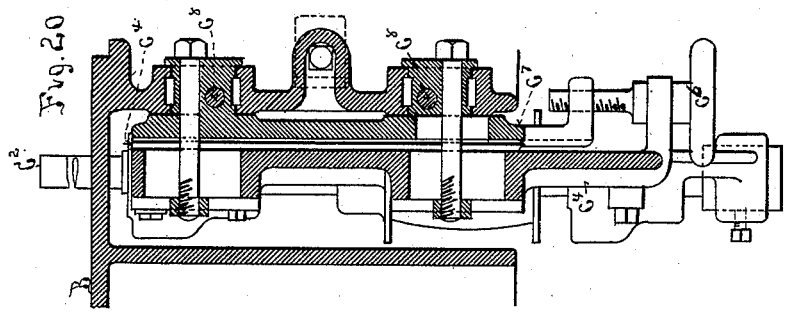
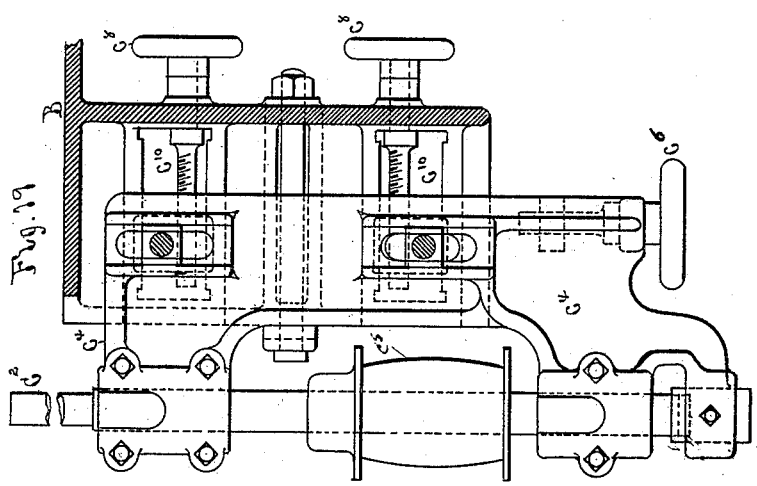
WITNESSES:
N. P. Ockington
Daniel T. Simpson
INVENTOR
Solomon A. Woods
BY David Hall Rice
ATTORNEY (No Model.) 11 Sheets—Sheet 9.
S. A. WOODS.
WOOD PLANING MACHINE.
No. 398,362. Patented Feb. 19, 1889.
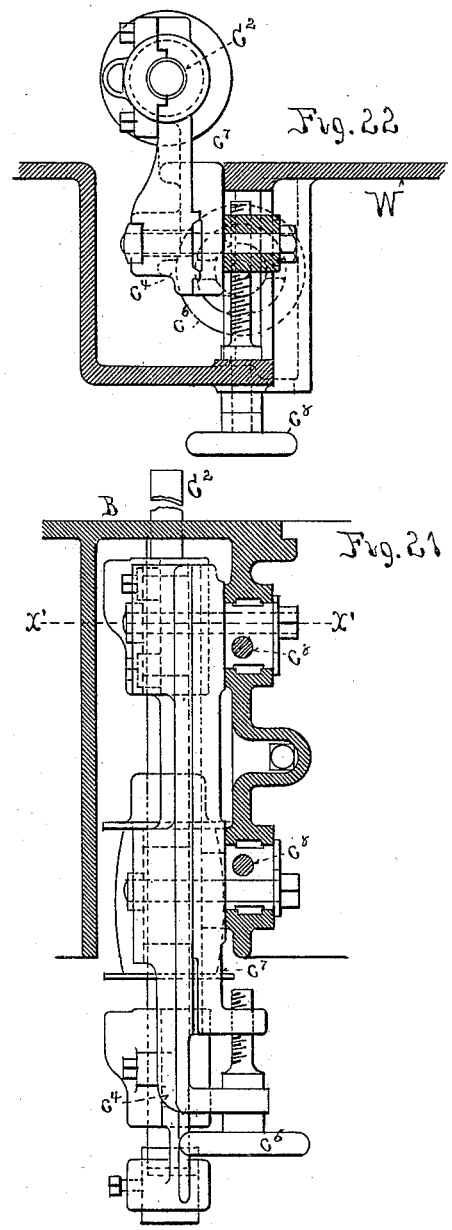
WITNESSES:
N. P. Ockington
Daniel S. Simpson
INVENTOR
Solomon A. Woods
BY David Hall Rice
ATTORNEY

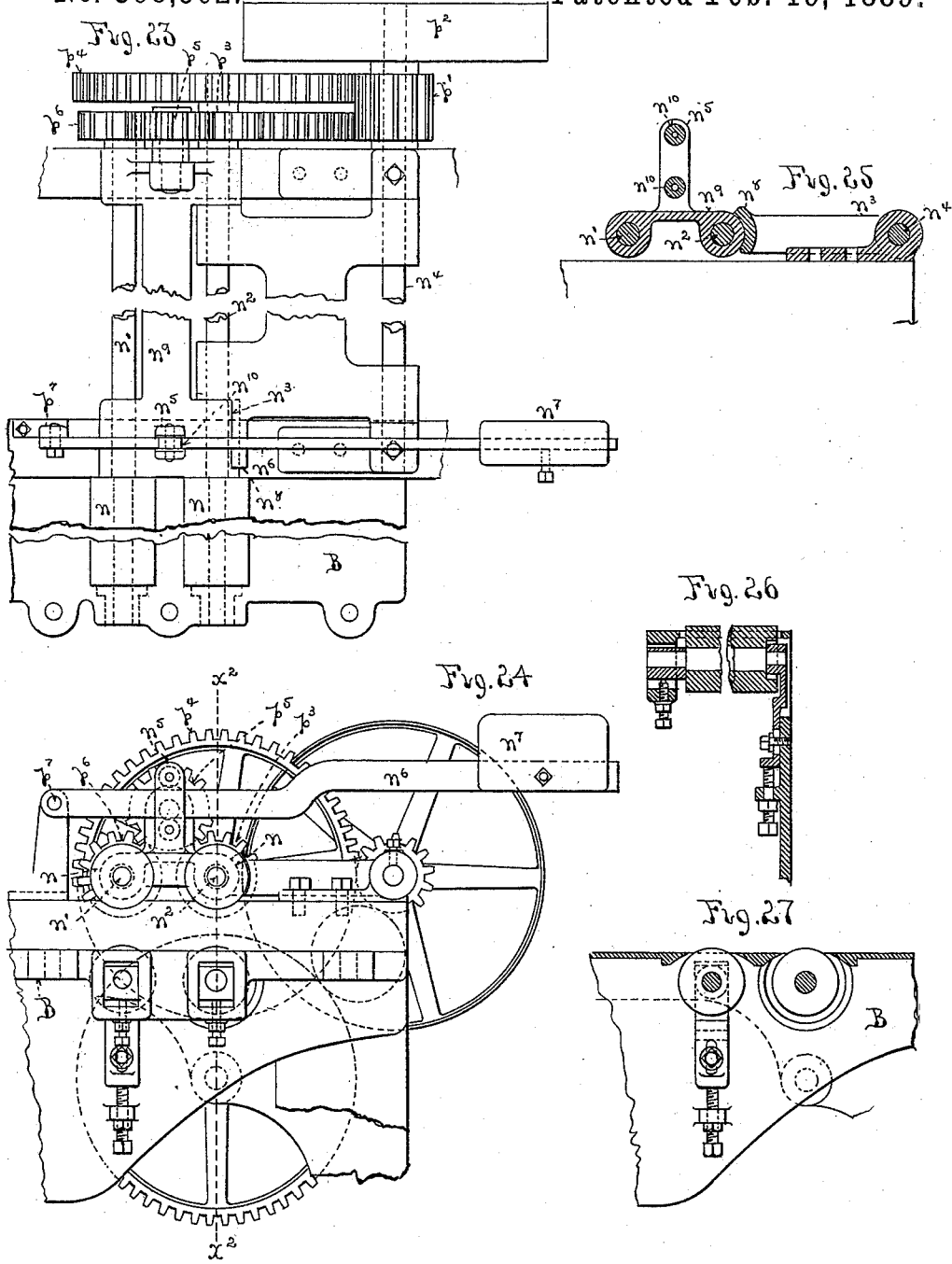

(No Model.) 11 Sheets—Sheet 11.
S. A. WOODS.
WOOD PLANING MACHINE.
No. 398,362. Patented Feb. 19, 1889.
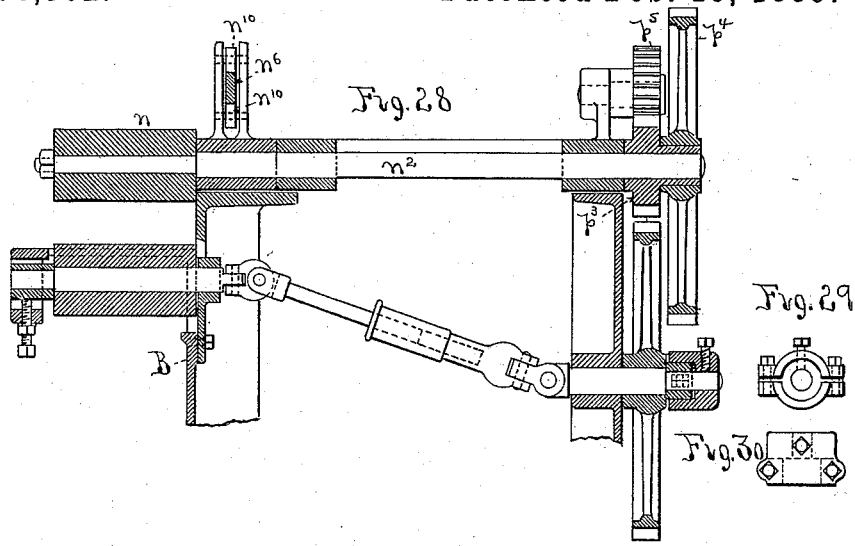
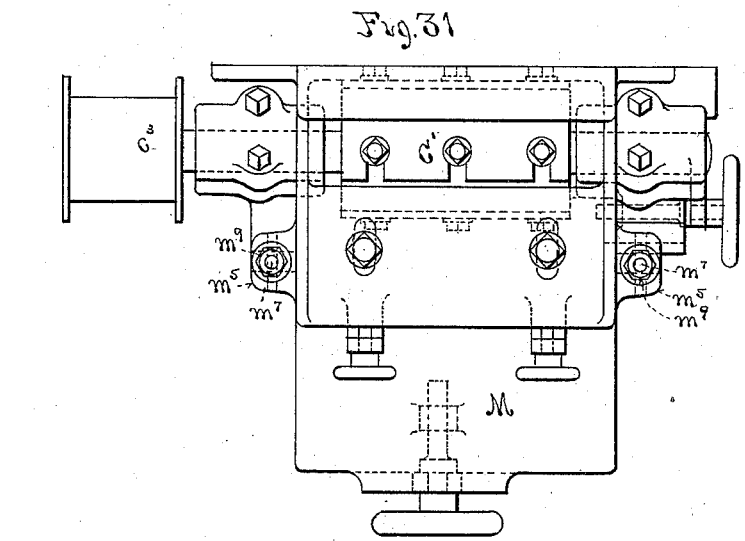
WITNESSES:
N. P. Ockington.
Daniel T. Simpson.
INVENTOR
Solomon A. Woods
BY David Hoel Lee
ATTORNEY

UNITED STATES PATENT OFFICE.

SOLOMON A. WOODS, OF BOSTON, MASSACHUSETTS.

WOOD-PLANING MACHINE.

SPECIFICATION forming part of Letters Patent No. 398,362, dated February 19, 1889.

Application filed December 3, 1885. Serial No. 184,608. (No model.)

*To all whom it may concern:*

Be it known that I, SOLOMON A. WOODS, of Boston, in the county of Suffolk and State of Massachusetts, have invented a new and useful Improvement in Wood-Planing Machines, of which the following is a specification.

My invention relates to machines for planing wood, and more especially to that variety known as "molding-machines;" and it consists of certain new and useful combinations and arrangements of the several parts, substantially as hereinafter described and claimed.

Figure 2:
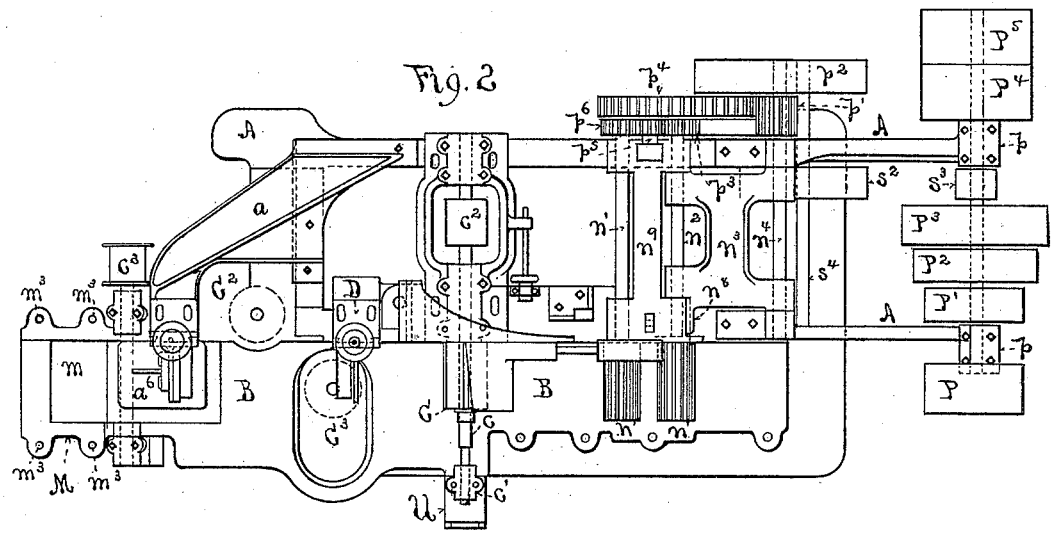
Figure 1:
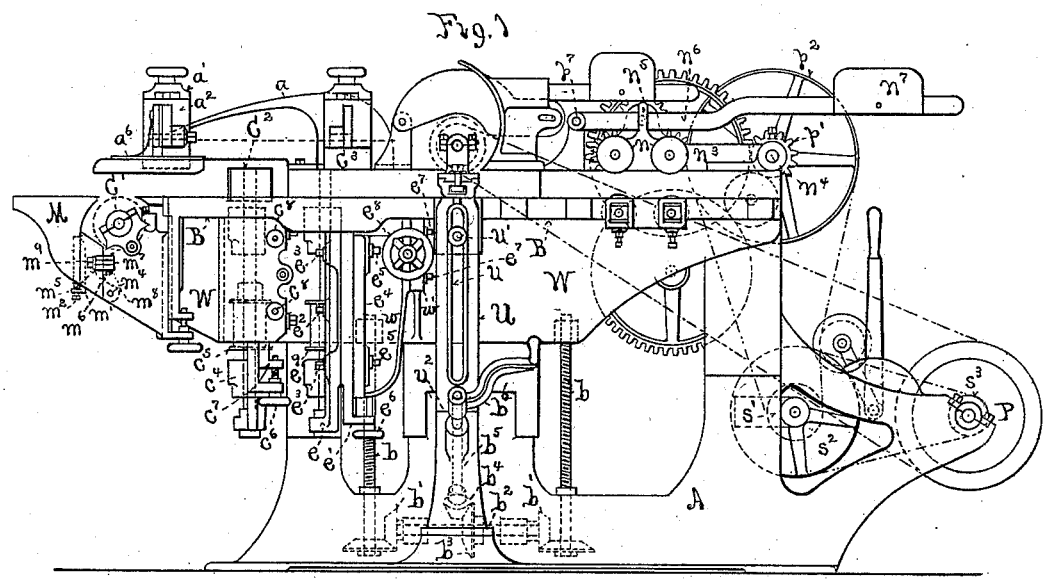
Figure 4:
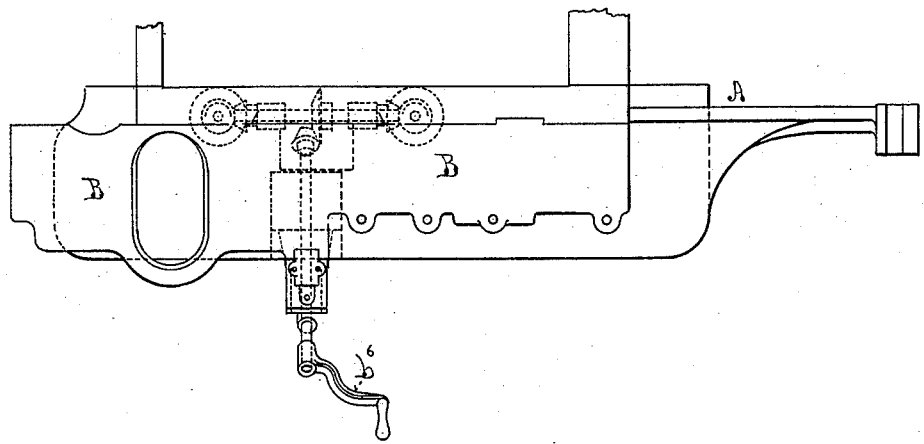
Figure 3:
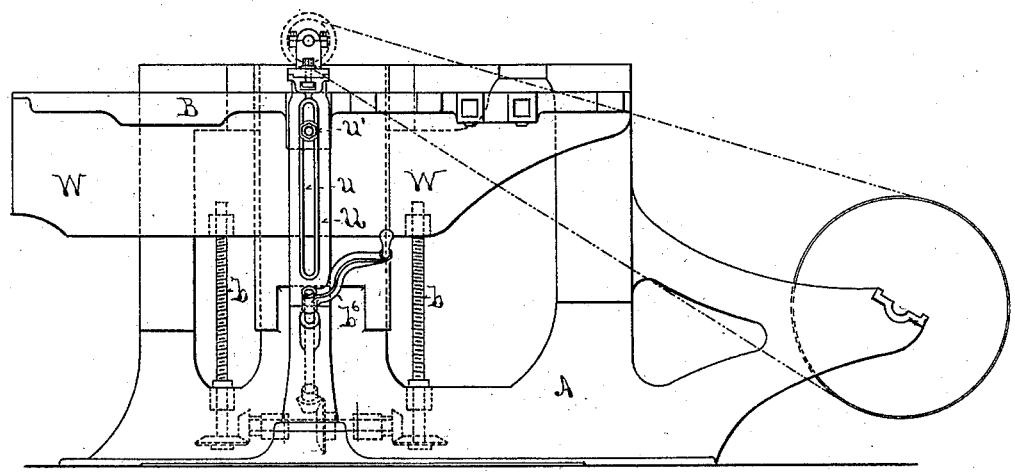
Figure 14:
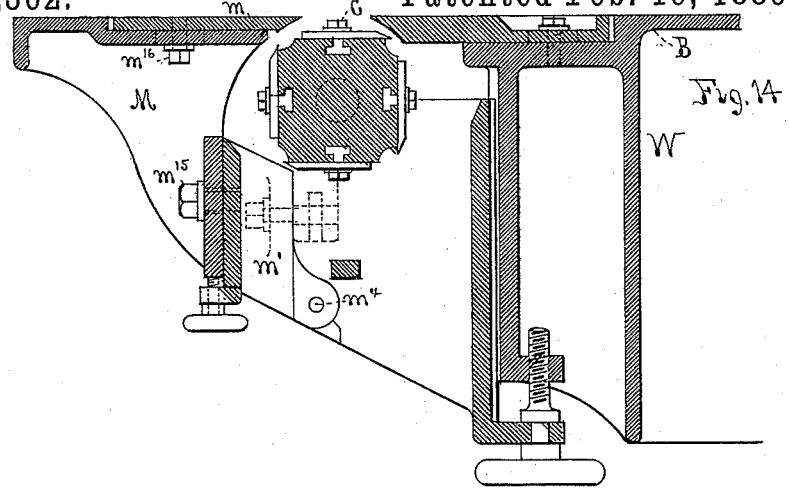
Figure 13:
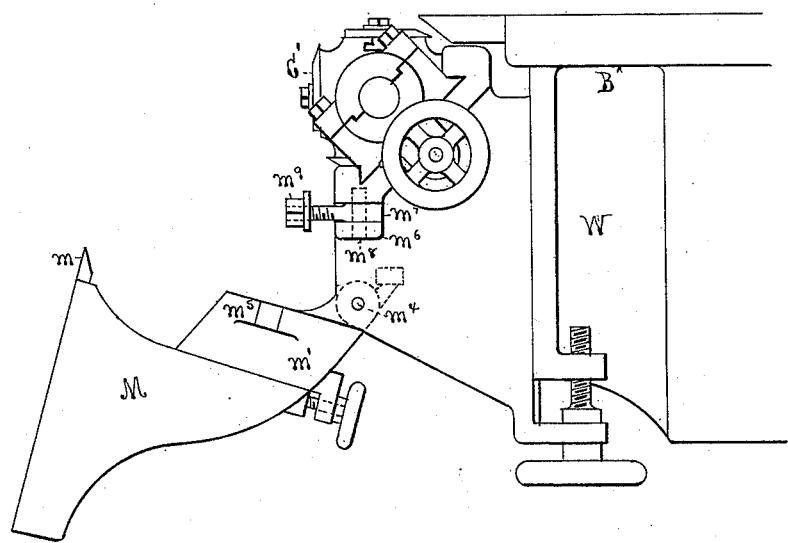

In the drawings, Figure 1 is a front side elevation of a planing-machine provided with my improvements. Fig. 2 is a top plan view of the same. Fig. 3 is a side elevation of the main frame with part of the mechanism removed. Fig. 4 is a top view of the same. Figs. 5, 6, 7, 8, 9, and 10 are detail views of parts of the working mechanism. Fig. 11 is an enlarged view of a portion of the machine at the feed-out end, in side elevation. Fig. 12 is a top plan view of the same. Fig. 13 is the same as Fig. 11, with the end of the table dropped down. Fig. 14 is a vertical longitudinal section of Fig. 11. Fig. 15 is an enlarged top plan view of the portion of the supporting parts and table in which the front vertical molding-head is mounted. Fig. 16 is a transverse vertical section of the same in front of the molder-head. Fig. 17 is a transverse vertical section of the same in rear of the molder-head. Fig. 18 is a longitudinal vertical section of the same through the plates supporting the cutter-head, substantially as hereinafter described. Fig. 19 is an enlarged view of a transverse vertical section of a part of its supporting parts and the table behind the rear vertical molder-head. Fig. 20 is a vertical longitudinal section of the same through the plates supporting the molder-head hereinafter described. Fig. 21 is a vertical longitudinal section through the table, showing the plates in edge view. Fig. 22 is a horizontal section of the same through the table on line X' X' of Fig. 21. Fig. 23 is an enlarged top plan view of the portion of the machine containing the feed-rolls. Fig. 24 is a side elevation of the same. Figs. 25, 26, and 27 are details of the same, partly in section. Fig. 28 is a transverse vertical section of the same on the line $X^2 X^2$ of Fig. 24. Figs. 29 and 30 are details of the same. Fig. 31 is a front end view of the part of the machine shown in Figs. 11, 12, and 14.

A is the main frame of the machine, which is what is known as a "side molder," or one having a table open or accessible on one side.

B is the table, which is made to rise and fall by means of screws $b\ b$. This table slides up and down in vertical guideways attached in the ordinary manner to frame A and on guides attached to the vertical web-piece W, which projects downward the whole length of the rear side of the table and stiffens the table as well as supports the nuts in which the screws $b\ b$ work, and the brackets for the bearings of the various mechanisms carried by the table in its up-and-down movement.

The driving-pulley P at one end of the frame is mounted on a counter-shaft journaled in boxes $p\ p$, attached to the frame, as are also the driving-pulleys $P'\ P^2\ P^3$. This counter-shaft is driven from any suitable motor by means of the pulleys $P^4\ P^5$.

C is the upper horizontal cutter-head mounted on the shaft $c$, which is supported in boxes on frame A in the ordinary manner, and also by a box, $c'$, attached to the upright U, which extends up and down in front of table B. This upright has a vertical longitudinal slot through it, $u$, through which the bolt $u'$, passing through an ear on table B, projects, and this bolt is provided with a nut on its outer end, which may be screwed up against the upright and so clamp the table more securely in any given position for doing nice work. The pulley $c^2$, attached to the shaft $c$, is belted from the pulley $P^3$ to revolve the cutter-head C.

C' is the lower horizontal cutter-head, which is mounted on a shaft in boxes supported by table B and moves up and down with it in the ordinary manner. At one end of its shaft is mounted the pulley $c^3$, which is belted from the pulley $P^2$.

$C^2$ is the rear vertical cutter-head mounted upon an upright shaft journaled in boxes attached to the table B and its web W by means of an intervening vertically-sliding plate, $c^4$, which moves in a guideway in a horizontally-sliding plate attached to the table and web W. A pulley, $c^5$, is attached to the upright shaft of this cutter-head, which is belted from the pulley P′, and a hand-wheel and screw, $c^6$, serves to raise and lower the plate $c^4$ up and down with reference to the table B.

$C^3$ is the front vertical cutter-head mounted upon an upright shaft turning in boxes attached to plate $e$. Plate $e$ is attached to plate $e'$ by bolt $e^2$, which serves as a pivot on which to swing plate $e$ out and in at its upper end in a vertical plane, thus inclining cutter-head $C^3$ from the perpendicular to enable it to cut a beveled edge on the molding. Two other bolts, $e^3$ $e^3$, are fixed in plate $e'$ and project through curved slots in plate $e$, having bolt $e^2$ as a common center of their curves, these slots fitting the bolts $e^3$ loosely, so as to move over them. Outside of plate $e$ these bolts $e^3$ are screw-threaded and provided with nuts, which may be screwed down upon the plate and clamp it in position after it is swung on bolt $e^2$.

Plate $e'$ is attached in turn to plate $e^4$ by bolts $e^5$ $e^5$, which project through vertical grooves in the latter, and are capable of moving up and down in these grooves. These bolts are screw-threaded and provided with nuts capable of being clamped down upon plate $e^4$ to secure it to plate $e'$ in any desired position. A hand-wheel and screw, $e^6$, passes through ears on plates $e^4$ and $e'$, and raises and lowers the latter in the usual manner. Plate $e^4$ has attached to it a web piece, $w$, flanged around its outer edge, as shown, and the face of this flange rests against an ear, $w'$, projecting outward from the web W of table B. The web $w$ is provided with guides where it comes beneath table B, and it has attached to it two bolts, $e^7$ $e^7$, which project through horizontal slots in ear $w'$, in which they are capable of being moved to and fro. These bolts have nuts screwed upon their outer ends to clamp the parts together when desired. A hand-wheel, $e^8$, is provided with a horizontal screw passing through ears on the ear $w'$ and flange of web $w$, and adapted to move the latter in and out in the ordinary manner. A pulley, $e^9$, is attached to the shaft of cutter-head $C^3$, and is belted onto pulley P.

It is of course understood that the parts of plate $e$ to which the boxes of this shaft are attached project far enough inward beyond the plates $e'$ $e^4$ and web $w$ and ear $w'$, as shown in Figs. 15 and 17, to allow the belt from pulley $e^9$ to pulley P to pass behind them. This construction of the parts brings the ear $w'$, which supports the cutter-head and intermediate adjusting mechanism, as well as the latter, between the pulleys $e^9$ and P, and causes the strain of the belt to come against the solid backing which plates $e$, $e'$, and $e^4$ have against each other and against the ear $w'$ instead of against the bolts and nuts holding the parts together, as would be the case if the pulley $e^9$ were on the other sides of the supporting parts. As has been stated, the vertically-sliding plate $c^4$ of the rear vertical cutter-head is attached to the plate $c^7$ (see Figs. 19, 20, 21, and 22) by means of guideways and the hand-wheel and screw $c^6$ to move it up and down. The plate $c^7$ is in turn attached to the table B and web W by horizontal guideways $c^{10}$, permitting it to move out and in transversely of the table in the usual manner.

Attached to the table by ears and passing through ears in plate $c^7$ are hand-wheels and screws $c^8$ $c^8$, which move the plate $c^7$ to and fro on its horizontal guideways $c^{10}$, and enable the rear vertical cutter-head to be adjusted from the front and same side of the table as the front vertical cutter.

The two screws $b$ $b$ which move the table B up and down are preferable to a single screw; but one may be used instead, if preferred. They are placed beneath the table to render them more convenient and less in the way than when above and behind the table; but as in this position it would be inconvenient to stoop down to reach any mechanism for revolving them I overcome that difficulty in the following manner:

On the lower end of each screw is attached a bevel-gear. These bevel-gears mesh with two bevel-pinions, $b'$, mounted on the horizontal shaft $b^2$, which turns in bearings attached to the frame. A bevel-gear, $b^3$, is attached to this shaft near its center, and into this meshes the bevel-pinion $b^4$, which is attached to the lower end of the inclined shaft $b^5$. This shaft is supported in bearings in the frame of the machine and in the upright U, and is inclined upward at such an angle as to bring its upper end within convenient reach of the operator of the machine. To this upper end is attached the crank $b^6$, by which the shaft is turned. I thus provide a mechanism for adjusting the table B up and down, which is accessible and convenient. The upright U has a joint, $u^2$, above the bearing of the shaft $b^5$, where its upper and lower portions are clamped together by the bolt $u^3$.

In case it is desired to mold or plane one side or edge of a board wider than table B, the bolts $u'$ and $u^3$ are removed and the upper end of the upright U is removed, thus preventing its obstructing the passage of the board through the machine. This upright U is supported upon a foot, $u^4$, projecting outward from the frame and resting on the floor or foundation on which it stands, thus giving it greater rigidity.

Projecting from the frame of the machine behind and over the table B is a curved arm, $a$, carrying upon its outer end the vertical plate $a'$. The latter has on its face a vertical guideway, $a^2$, Figs. 8 and 9, on which the plate $a^3$ moves up and down. Passing through ears on plates $a'$ $a^3$ is the screw $a^4$, which is journaled in the ear of the plate $a'$, and works in a screw-thread in the other ear to adjust plate $a^3$ up and down. The plate $a^3$ has two horizontal slots, $a^5$, through it, and a presser-foot, $a^6$, is secured upon it by screw-bolts $a^7$ $a^7$ passing through these slots, the bolts being narrower than the slots, so as to allow the presser-foot to be swung up, with its lower face at an angle from the face of the table in either direction transversely. Two set-screws, $a^8$ $a^8$, are inserted into holes tapped into the vertical web of the presser-foot. By screwing these screws inward the lower face of the presser-foot may be canted or tipped at an angle longitudinally to the face of table B by the pressure of the ends of the screws against the face of plate $a^3$. This presser-foot is intended to have secured to its lower face, by screws through holes $v$ $v$, Fig. 7, a wooden shoe, the reverse on its lower face of the molding to be stuck. These adjustments of the presser-foot enable this shoe to be fitted to it, so as to bear evenly upon the molding, with much less care and trouble.

D is another arm projecting from the framework over the table B and carrying a plate with guideways, a vertically-sliding plate thereon, a hand-wheel and screw, and a presser-foot attached to and adjustable upon the vertically-sliding plate, all constructed like the similar parts attached to arm $a$, as just described.

In case it is desired to use a wooden shoe long enough to reach from the presser-foot of arm $a$ to that of arm D, which shoe is to be attached to both presser-feet in the usual manner, it will be observed that they are capable of being adjusted by my mechanism to bring the shoe to a true bearing upon the molding, as before described.

The part M of the table B on the lead-out side of the cutter-head C' is provided with a supplemental bed-plate, $m$, countersunk into the part M on top of the same. This supplemental bed-plate is for the purpose of adjustment to the set of the knives of cutter-head C'. Part M is attached to the front face of part $m'$, upon which it moves up and down by means of a slot formed through the part M and a bolt, $m^{15}$, as shown in dotted lines in Fig. 11. An ear projecting at a right angle from the lower end of part $m'$ has passing through it the smooth body of the screw $m^2$, which screws into a hole tapped into the part M of the table. By turning this screw the part M and supplemental bed-plate $m$ are adjusted up and down to the cutters, as described. Supplemental bed-plate $m$ has bolts $m^{16}$ projecting from its lower face through longitudinal slots in part M with nuts on the lower ends of the bolts, as shown by dotted lines in Figs. 10 and 11. By means of these bolts and nuts supplemental bed-plate $m$ may be secured in the proper position after having been adjusted horizontally to the cutters.

In four holes, $m^3$ $m^3$, Fig. 2, in the edges of part M of the table are inserted set-screws, by which the side guide-pieces are attached to the top of the table to guide the piece of wood being "stuck" in its passage through the machine and between them.

It is necessary to swing the part M of the table out of the way of the cutter-head C' to readily obtain access to it for adjusting its knives, &c. It has been customary to do this by swinging the part M of the table sidewise on a vertical pivot, but in order to do this one of the side guide-pieces must be removed with its set-screws from the top of this part of the table and replaced and readjusted when the latter is swung back to place. To obviate the necessity of doing this, I suspend the part M to the table B by a horizontal pivot, $m^4$, passing through the table B from side to side and through an ear of part $m'$, (shown in dotted lines in Fig. 1,) thus allowing the latter to drop downward freely away from the lumber being stuck and swung up again without disturbing the side guides.

To hold the part $m'$ to the table B firmly, an ear, $m^5$, is attached to the side of the part $m'$ and an ear, $m^6$, to the table B, and these ears are slotted horizontally inward to a sufficient depth to receive the bolt $m^7$ sidewise, the head end of the bolt being pivoted in the ear $m^6$ by a vertical pivot, $m^8$, through the ear, up and down on which it swings horizontally. A nut, $m^9$, on the other end of bolt $m^7$, serves to clamp the two ears solidly together when in the position shown in Figs. 1, 11, 13, and 31.

The operation of the parts is as follows: The nut $m^9$ is unscrewed and the bolt $m^7$ is swung horizontally outward on its pivot until it clears the ear $m^5$. The part M of the table is then dropped down on its pivot $m^4$, as before described. On the opposite or rear side of the table another pair of ears and a swiveled bolt and nut, like $m^5$, $m^6$, $m^7$, and $m^9$, may be attached, if it is desired to hold the part M to the remainder of table B more rigidly than with the similar parts above described.

The lower cylinder or cutter-head, C', is attached to a frame which slides up and down on guideways upon a flange attached to and projecting downward from the table B, and the bar or mouth-piece on the feed-in side of this cutter-head is attached firmly to the table. The bar, bed-plate, or mouth-piece $m$ on the opposite or feed-out side of the cutter-head is attached to ears which project downward under the cutter-head and are pivoted to its frame at $m^4$. By this construction the adjustment of the cutter-head frame upon the table B adjusts and carries with it the mouth-piece $m$ on the feed-out side, with relation to the bar or mouth-piece on the feed-in side of the cutter-head. This arrangement obviates the necessity of providing an independent adjustment for the boxes of the cylinder C' in the frame, as would be necessary if the mouth-piece on the feed-in side of the cutter-head were attached to the cutter-head frame and moved up and down with it when the frame was adjusted vertically with relation to the table B. By the use of the screw and hand-wheel for adjusting the cutter-head or cylinder C' vertically with relation to the table B, all vibration of the cutter-head with relation to its feed-in bar or mouth-piece is obviated, and irregularities in planing the lumber are avoided. This constructions enables me to drop down the part M of the table when the side guide-pieces are attached to it, by means of the holes $m^3 m^3$, as before described, and while the molding is in the machine and projecting over it, in order to adjust the lower cylinder or cutter-head, C', with relation to its bar or mouth-piece on the feed-in side, it being important to make this adjustment to have the depth of cut of the cutter-head exactly right, and when this is accomplished the part M is swung up to place again and needs no further adjustment either of its side guide-pieces or of itself with relation to the cutter-head and its feed-in bar or mouth-piece. This function of the part M of the table with relation to the adjustment of the cutter-head and itself to the bar or mouth-piece on the feed-in side, when the lumber is in the machine, would manifestly be impossible to be performed if the part M swung sidewise instead of downward away from the lumber. As it is customary to adjust the cutter-head C' to its feed-in bar or mouth-piece by means of templet-moldings or pattern-moldings partially cut, which are placed in the machine for that purpose and project over the part M of the table, in order to produce extreme accuracy of work and accomplish the adjustment quickly the described construction of the parts becomes important in the practical use of the machine.

Above the table B, on the lead-in side, are placed the feed-rollers $n\ n$, projecting outward on the ends of shafts $n'\ n^2$. The frame $n^3$ is pivoted to shaft $n^4$, which passes through and is journaled in the sides of the frame A and carries on its end the pinion $p'$ and pulley $p^2$, which is belted on pulley $s'$, mounted on shaft $s^4$. Attached to this shaft is the pulley $s^2$, which belts to the pulley $s^3$, the latter being attached to the same shaft as the fast and loose pulleys $P^4\ P^5$. The shaft $n^2$ is journaled in frame $n^3$ and rises and falls with it, carrying on its end pinion $p^3$ and gear-wheel $p^4$, which meshes into pinion $p'$. Another frame, $n^9$, has the shafts $n'\ n^2$ journaled in it, and carries on a stud projecting from it the pinion $p^5$, which gears into and connects pinion $p^3$ with pinion $p^6$ on the end of shaft $n'$.

From frame $n^9$ projects upward the strap or stud $n^5$, through a mortise in which passes lever $n^6$, which has a weight, $n^7$, on its outer end, and serves to press down the feed-rolls $n\ n$, this lever being pivoted to a stud projecting from the frame at $p^7$. This mechanism is well known and permits the feed-rolls, while being driven positively, to rise and fall to accommodate themselves to the inequalities of the lumber. As the strain on the feed-rolls in driving the lumber through the machine is horizontally toward the lead-in end of table B, it comes upon the shaft $n^2$, as ordinarily constructed, at the feed-roll end thereof, and I relieve the shaft of this strain by attaching to the frame $n^3$ a projection, $n^8$, which extends from the frame toward the feed-roll and presses against the part of frame $n^9$ in which shaft $n^2$ is journaled at that end, this part of the frame being made cylindrical to allow the shaft to turn in both frames, as heretofore. In the slot or mortise in the stud $n^5$, through which the lever $n^6$ passes, I also place a friction-roller, $n^{10}$, above, and another, $n^{10}$, below the lever, Fig. 10, which avoids friction between the lever and stud when the feed-rollers $n\ n$ rise and fall in feeding the lumber through the machine.

What I claim as new and of my invention is—

1. In a wood-planing machine, the combination, with the rising-and-falling table B, having the upright U extending upward upon the front side of it, and formed of a lower section and an upper detachable section, and moving up and down upon guideways upon the frame on the rear side of it, of one or more screws, $b\ b$, provided with bevel pinion or pinions upon their lower end or ends, inclined shaft $b^5$, projecting upward and outward and downward and inward through the upright U, below its upper detachable section, in position to be within reach of the operator while observing the distance of adjustment of the table from above the latter frame, and carrying the crank $b^6$ on its outer and upper end, and the pinion $b^4$ on its inner and lower end, and a gear mechanism connecting the gear or gears on the lower end or ends of said screw or screws, with the gear $b^4$, substantially as described.

2. In a wood-planing machine, the combination of the rising-and-falling table B, the inclined shaft $b^5$, having a bearing in the upright U and projecting outside of it, with the latter extending up and down outside of the path of the table and above the top thereof and having a joint, $u^2$, and its clamping mechanism above the shaft and below the table-top, whereby its upper part is adapted to be removed and replaced from in front of the table, substantially as described.

3. In a wood-planing machine, the combination of frame A, pulley P, rising-and-falling table B, provided with flanges W $w'$ beneath the same, and the cutter-head $C^3$ and its shaft and pulley $e^9$, supported upon a yoke, adjustably attached by bolts to the opposite side of flange $w'$ from the pulley P, said yoke being pivoted in substantially the same horizontal plane with pulley $e^9$ and upon one side thereof, substantially as described.

4. In a wood-planing machine, the combination of the pulley P, the rising-and-falling table B, provided with flanges W $w'$ beneath the same, plate $e^4$, sliding inward and outward on flange $w'$, plate $e'$, sliding vertically upward and downward on plate $e^4$, and the cutter-head $C^3$ and its shaft and pulley $e^9$, supported upon a yoke pivoted to plate $e'$ in substantially the same horizontal plane as pulley $e^9$ and upon one side thereof, the said plates and yoke being attached to flange $w'$ and to each other, respectively, in the order named on their opposite sides from pulley P, substantially as described.

5. The combination of the table B, the lower horizontal cutter-head, C', mounted on bearings therein at one end and below the upper surface of the same, and the extension M $m'$ of said table, in two parts adapted to be adjusted vertically one upon the other, pivoted thereto by the horizontal pivot $m^4$ below said cutter-head, and provided with clamping mechanism to secure said extension in position with its upper surface parallel to that of said table, substantially as described.

6. The combination of table B, having the slotted ear $m^6$, and swinging bolt $m^7$, and nut $m^9$, connected thereto, the lower horizontal cutter-head, C', mounted on bearings therein at one end below the upper surface of the same, and the extension M $m'$ of said table in two parts adapted to be adjusted vertically one upon the other, pivoted thereto by the horizontal pivot $m^4$ below said cutter-head, and having part $m'$, provided with the slotted ear $m^5$, substantially as described.

7. The combination of the table B, having the extension M $m'$ pivoted thereto, the horizontal cutter-head C', mounted in bearings below the table-surface and between its main part and extension M, and the supplemental bed $m$, adjacent to said cutter-head and mounted upon the vertically-sliding part M, having the adjusting-screw $m^2$, substantially as described.

8. The combination of the feed-roll shaft $n'$, feed-roll shaft $n^2$, frame $n^9$, and frame $n^3$, pivoted to the main frame A, and provided with the projecting shoulder $n^8$, taking a bearing against frame $n^9$ outside the bearing of shaft $n^2$ therein, upon which the latter frame is pivoted, substantially as described.

9. The combination of the frame $n^3$, pivoted to main frame A, shaft $n^2$, having pivotal bearings in frame $n^3$ and frame $n^9$, and the latter provided with slotted stud $n^5$, having friction-rollers $n^{10}$ $n^{10\prime}$ in its slot, and the pivoted lever $n^6$, passing through between said rollers, substantially as described.

10. The combination of table B, arm $a$, provided at its outer end with vertical guideways, plate $a^3$, moving up and down on said guideways, and presser-foot $a^6$, connected to said vertically-moving plate by universal pivotal connections, substantially as described, adapted to incline its lower face at an angle to the table-surface either longitudinally or transversely thereof, and clamping mechanism to secure said plate in such inclined position, substantially as described.

11. The combination of table B, arm $a$, provided at its outer end with vertical guideways, plate $a^3$, moving up and down on said guideways, and presser-foot $a^6$, pivotally connected to said plate by one or more bolts, $a^7$, and provided with one or more adjusting set-screws, $a^8$, substantially as described.

12. The combination of the table B, carrying a throat or mouth-piece for the lower cutter-head, C', on its feed-in side, the said cutter-head and its spindle and the cutter-head frame supporting the bearings thereof mounted on vertical guideways on the table and adjustable vertically with relation to the throat or mouth-piece of the latter, and a bar or mouth-piece arranged parallel with the cutter-head on the feed-out or delivery side thereof, provided with downwardly-projecting arms or brackets supporting said bar or mouth-piece at the ends, and connected by horizontal pivots with the cutter-head frame below the cutter-head, whereby provision is afforded for swinging said bar or mouth-piece on its feed-out side downward from its normal or operative position and away from the cutter-head in a plane transverse to the length thereof, and whereby any rising or falling movement of the cutter-head frame with relation to table B and its attached throat or mouth-piece on the feed-in side will produce a corresponding movement of the said bar or mouth-piece on the feed-out side, substantially as described.

13. The combination of the table B, carrying a throat or mouth-piece for the lower cutter-head, C', on its feed-in side, the said cutter-head and its spindle and frame supporting the bearings thereof, mounted on vertical guideways on table B and provided with a screw and hand-wheel for adjusting the same vertically with relation thereto, and a bar or mouth-piece arranged parallel with the cutter-head on the feed-out or delivery side thereof, provided with downwardly-projecting arms or brackets supporting said bar or mouth-piece at the ends and connected by horizontal pivots with the cutter-head frame below the cutter-head, whereby provision is afforded for swinging said bar or mouth-piece on its feed-out side downward from its normal or operative position and away from the cutter-head in a plane transverse to the length thereof, and whereby any rising or falling movement of the cutter-head frame with relation to table B and its attached throat or mouth-piece on the feed-in side will produce a corresponding movement of the said bar or mouth-piece on the feed-out side, substantially as described.

SOLOMON A. WOODS.

Witnesses:
DAVID HALL RICE,
N. P. OCKINGTON.